United States Patent
Krzycki

[15] 3,668,868
[45] June 13, 1972

[54] PREPACKAGED LIQUID ROCKET POWERPLANT FEED SYSTEM

[72] Inventor: Leroy J. Krzycki, China Lake, Calif.

[73] Assignee: The United States of America as represented by the Secretary of the Navy

[22] Filed: July 30, 1970

[21] Appl. No.: 64,918

[52] U.S. Cl.................................60/39.48, 60/259, 222/95
[51] Int. Cl..........................................................F02c 3/12
[58] Field of Search..........................60/39.48, 259; 222/95

[56] References Cited

UNITED STATES PATENTS

| | | | |
|---|---|---|---|
| 3,296,803 | 1/1967 | Kroekel | 60/39.48 |
| 3,135,092 | 6/1964 | Dagne | 60/39.48 |
| 3,561,644 | 2/1971 | Works | 222/95 |
| 3,592,360 | 7/1971 | Aleck | 222/95 |
| 2,868,127 | 1/1959 | Fox | 60/259 |

Primary Examiner—Samuel Feinberg
Attorney—R. S. Sciascia and Thomas O. Watson, Jr.

[57] ABSTRACT

A propellant feed system for a rocket having mechanically linked pistons attached to longitudinally involuted rolling metal bladders. Each propellant tank contains a rolling metal bladder positive expulsion device in which the propellant is hermetically sealed and stored. In operation, propellant expulsion occurs when a high pressure gas forces the piston assembly to traverse the propellant tanks longitudinally while the metal bladders are forced to roll back on themselves and follow. As a result, the rolling metal bladders are plastically deformed as they roll around the initial involution, effectively turning themselves outside-in, and the liquid propellants contained therein are expelled through a flow control device into the thrust chamber assembly for combustion and thrust generation.

7 Claims, 3 Drawing Figures

PATENTED JUN 13 1972 3,668,868

INVENTOR.
LEROY J. KRZYCKI
BY Thomas O. Watson Jr.
ATTORNEY

PREPACKAGED LIQUID ROCKET POWERPLANT FEED SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to improvements in liquid rocket power plants, and more particularly it pertains to a new and improved feed system wherein mechanically linked pistons are used to expel propellants from rolling metal bladders.

In the field of prepackaged liquid rocket power plants, it has been the general practice to employ pistons with dynamic seals (i.e., O-rings or wiper seals), or rolling metal bladders or collapsing metal bladders to provide positive expulsion of the propellants. All such prior art devices have been unsatisfactory to some extent. Pistons have the disadvantages of seal leakage and also the inside surface or the propellant tanks must be very smooth and concentric for seal operation. Rolling metal bladders, having a center-located piston guide, eliminate the requirement for dynamic seals but present problems of piston-head cocking, rapid pressurization forces, and small diameter rolling metal bladder operation for the center-located piston guide. Collapsing metal bladders present problems of metal folding and tearing, of requiring internal pressurization during storage to prevent bladder movement and fatigue, and cause greater movement of the propulsion system center-of-gravity during operation than pistons or rolling metal bladders. The problems of the various expulsion systems have been amply demonstrated in the prior art, especially in the development of missiles.

The above problems are overcome by the present invention which combines the advantages of piston positive expulsion and rolling metal bladder positive expulsion and, at the same time, eliminates their individual disadvantages.

SUMMARY OF THE INVENTION

The general purpose of this invention is to provide a hermetically sealed prepackaged liquid rocket power plant feed system with positive expulsion of the contained liquid propellants by utilizing linked pistons and a rolling metal bladder positive expulsion and containment technique. The propellant feed system has mechanically linked pistons attached to longitudinally involuted rolling metal bladders. Each propellant tank contains a rolling metal bladder positive expulsion device in which the propellant is hermetically sealed and stored. In operation, propellant expulsion occurs when a high pressure gas forces the piston assembly to traverse the propellant tanks longitudinally while the metal bladders are forced to roll back on themselves and follow. As a result, the rolling metal bladders are plastically deformed as they roll around the initial involution, effectively turning themselves outside-in, and the liquid propellants contained therein are expelled through a flow control device into the thrust chamber assembly for combustion and thrust generation.

The new features of this invention include the simultaneous use of mechanically linked pistons with the rolling bladders, thereby eliminating the dynamic seals normally used with pistons. Also, the use of bonded rolling bladders on the outer walls of the propellant tanks allows the tanks to experience greater deformation and rough handling in the field than would be the case with the regular dynamic seals normally used with pistons. Moreover, the mechanical arrangement of the components in the feed system of the present invention provide for efficient packaging of the auxiliary components (such as gas generator, ignition safety device, rapid start device, relief valves, etc.) required for prepackaged liquid rocket power plant operation. This unique mechanical arrangement also eliminates many of the concentric tubes and ducts normally associated with prepackaged rocket power plants and is therefore an improvement over previous prepackaged liquid rocket power plants.

OBJECTS OF THE INVENTION

An object of the present invention is to retain the stability and the rigidity of pistons and to retain the all-metal, non-dynamic sealing advantages of rolling metal bladders.

Another object of the invention is to eliminate the dynamic sealing required by conventional pistons and to eliminate the problem of piston-head cocking and the instability of free-running rolling bladders.

A further object of the invention is to eliminate the need for small diameter center-guided rolling bladders.

Still another object is to assure simultaneous propellant flow due to mechanically linked pistons.

A still further object of the invention is to provide for oxidizer-fuel mixture ratio control because the expulsion rate of each propellant tank is controlled by mechanically linked piston-rolling bladders.

Other objects, advantages and novel features of the invention will become apparent from the following detailed description of the invention when considered in conjunction with the accompanying drawings.

DESCRIPTION OF THE PREFERRED EMBODIMENT

Figure 1:
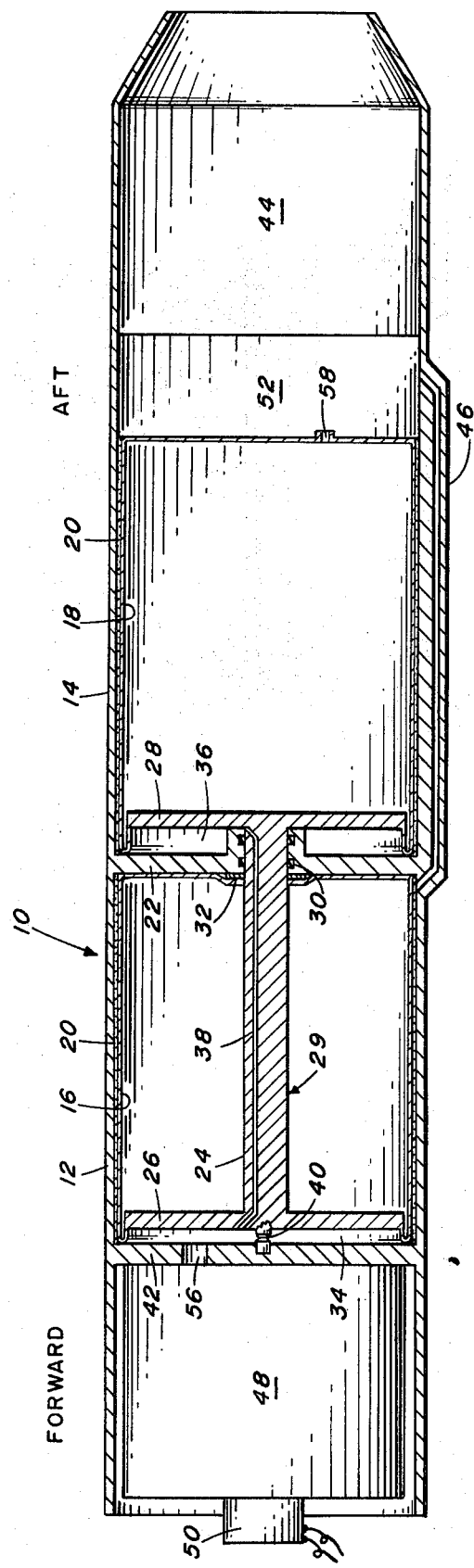
FIG. 1 shows a cross section view of a preferred embodiment of the invention.

FIG. 1, which illustrates a preferred embodiment of the invention, shows a housing 10 with a forward propellant tank 12 and aft propellant tank 14 of the power plant arranged in tandem. Either propellant tank can be used for oxidizer or fuel and the tanks may be of the same or of unequal diameters or lengths. Rolling metal bladders 16 and 18, fabricated of thin ductile material, are used to completely surround and contain the liquid propellants during storage. The bladders 16 and 18 are bonded to the propellant tanks 12 and 14, respectively, with a suitable bonding agent 20. A metal bulkhead 22 separates the two tandem tanks 12 and 14 and also provides a guide for a connecting rod or tube 24 which mechanically joins two piston heads 26 and 28 to form a piston assembly 29. Piston 26 is fixedly attached to the forward portion of bladder 16 and piston 28 is fixedly attached to the forward portion of bladder 18. The piston connecting rod 24 passes through a suitable dynamic seal 30 which is retained by the metal bulkhead 22 separating the two propellant tanks. The purpose of seal 30 is to prevent propellant and/or pressurizing gas from escaping pass the stationary or moving connecting rod 24 during power plant operation. A metal shear seal 32 is welded to both bladder 16 and connecting rod 24. During power plant storage the connecting rod seal 30 is separated from the propellant by the metal shear seal 32 and thus hermetically seals the propellant in the bladder. The rod seal 30 is exposed to the contained propellant only during power plant operation which is typically seconds or, at most, several minutes. If the oxidizer (typically the more reactive of the two propellants) is contained in the aft propellant tank 14 (nearest the thrust chamber assembly 44) then the connecting rod seal 30 must seal only fuel which is relatively inert with respect to the elastomeric sealing materials which are used for the O-rings and other types of dynamic seals.

As shown in FIG. 1, a gas generator 48 is located in the forward portion of housing 10 and provides high pressure gas via an opening 56 to a space 34 to drive the piston assembly 29. The space or volume 34 behind the forward piston 26 is connected to volume 36 behind aft piston 28 by a small diameter tube or hole 38 formed in the piston connecting rod 24 so that pressurizing gas is at all times present behind the aft piston 28 to prevent inward collapse of the rolling bladder 18 by the pressurized liquid propellant contained between the rolled and unrolled portions of the bladder.

Unwanted movement of the connected piston assembly 29 during storage is prevented by a shear device 40 which physically attaches the piston assembly 29 to a tankage forward bulkhead 42.

FIG. 1 also shows that the propellant in the forward tank 12 is transferred around the aft tank 14 to a thrust chamber assembly 44 by a duct 46 which is located external to the tankage arrangement. If the diameter of the two tanks 12 and 14 is not equal, and if the diameter of the aft tank 14 is less than the diameter of forward tank 12, the propellant transfer duct 46 can be within the maximum diameter of the power plant housing 10, thus affording a smooth protuberance-free unit. The propellant in aft tank 14 is expelled via a duct 58, as shown in FIG. 1.

The gas generator 48 of the power plant may be a stored cold gas system, a demand liquid propellant system, or a solid propellant system. Also, the gas generator 48 may incorporate chemical energy materials which provide large quantities of gas for a short duration to assist in the rapid pressurization of the power plant. A gas relief valve (not shown) to vent overboard unwanted pressurizing gas may be incorporated in the gas generator system. The gas generator may be contained external to the forward bulkhead 42 or may be contained within the power plant, as for example, shown in FIG. 2 wherein a solid propellant or other type of gas generator 48a is contained within the piston connecting rod 24. A booster charge could also be incorporated in the piston connecting rod 24 to assist in the rapid pressurization of the power plant.

Because of the different densities of various liquid propellants, and the normally different densities with respect to temperature of the fuel and the oxidizer of a prepackaged liquid rocket power plant, the amount of fuel and the amount of oxidizer in the power plant feed system must be predetermined, based on the measured properties of the propellants, so that the simultaneous movement of the connected pistons 26 and 28 causes a uniformly equal pressure rise in the contained liquids during power plant start-up. Unless this is done, the thrust chamber 44 of the power plant may experience undesirable fuel or oxidizer flow leads, with consequent unstable or catastrophic combustion behavior. The diameter of the piston connecting rod 24 may also be chosen to assist in providing the correct propellant volume ratio between the oxidizer and the fuel tanks.

OPERATION OF THE INVENTION

To initiate operation of the rocket power plant, an electrical current is caused to flow through an ignition safety device 50 which has previously and knowingly been placed in an "operate" position. The electrical current initiates operation of the gas generator 48 which then supplies high pressure gas via opening 56 to the volume 34 behind the forward piston 26. At the same time, gas flows through the access hold 38 to supply high pressure gas to the volume 36 behind the aft piston 28. The gas pressure, acting over the exposed areas of the pistons 26 and 28, exerts a force on the piston assembly 29 which is sufficient to break the shear device 40 thus freeing the piston assembly for longitudinal movement within the tankage housing 10. As the pistons 26 and 28 traverse the tanks 12 and 14, they cause the metal bladders 16 and 18 to roll back on themselves and follow. As a result, the rolling metal bladders 16 and 18 are plastically deformed as they roll around the initial involution, effectively turning themselves outside-in. The contained liquid propellants are positively expelled from the tanks 12 and 14 through a suitable flow control device 52 to the thrust chamber assembly 44 wherein the propellants are burned and hot gases are generated which pass through a nozzle and generate thrust.

ALTERNATIVE EMBODIMENTS OF THE INVENTION

Figure 2:
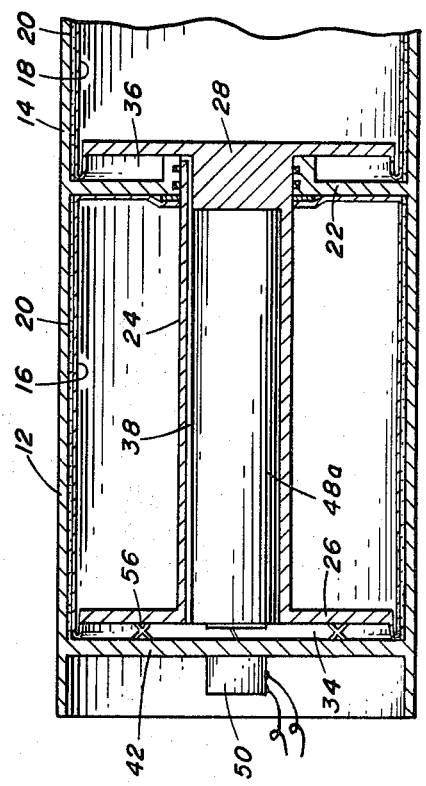
FIG. 2 illustrates a modification of the location of the gas generator of the feed system of the present invention.

This invention is adaptable to modification without deviating from the scope of the inventive concept. Alternative embodiments of this invention relate to the choice of different materials and sealing techniques, and the choice of placement of auxiliary components (such as gas generators) within the feed system. As discussed above, FIG. 1 shows the invention with a self-contained demand gas generator 48 contained external to the forward bulkhead 42. FIG. 2, meanwhile, shows the invention with a self-contained solid propellant gas generator 48a contained within the piston connecting rod 24. Another possible modification could be a variable demand liquid propellant gas generator contained within the connecting rod 24. To accommodate these changes a shear device 56, as shown in FIG. 2, would be employed for the same purpose as the shear device 40 and the ignition safety device 50 would be located as shown in FIG. 2.

Figure 3:
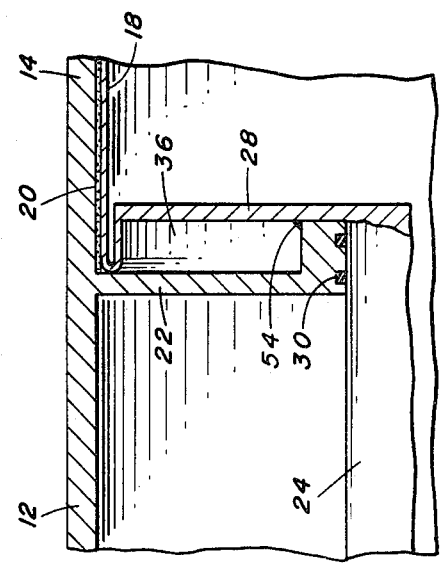
FIG. 3 illustrates a modification of the sealing arrangement of the present invention.

A possible alternative to the piston connecting rod seal 30 is to have the propellant hermetically sealed by a metal burst band 54, but with the burst band 54 located on the aft side of the seal 30, as shown in FIG. 3. Thus, while the seal would be immersed in the propellant during the lifetime of the power plant, the seal would not be subjected to the possible rough metal edges of the sheared sealing band during power plant start-up.

The metal rolling bladders 16 and 18 may be fabricated of aluminum, aluminum alloys, stainless steels, mild steel, copper, or other ductile metal, or may be made of an elastomeric material if compatibility with the contained liquid propellant permits.

The piston heads 26 and 28 of the rolling bladders 16 and 18 and the corresponding tankage closures of bulkheads 22 and 42 could be flat, concave, or convex, depending on the packaging criteria of the particular design and the operating pressures of the power plant.

The rolling metal bladders 16 and 18, which require bonding to the tank walls to prevent inward collapse by the pressurizing gas, could be bonded with any number of adhesives such as epoxy, silicon rubbers, or materials such as Teflon.

Obviously many modifications and variations of the present invention are possible in the light of the above teachings.

What is claimed is:

1. A power plant feed system comprising:
   a housing;
   a forward and aft propellant tank arranged in said housing;
   a rolling bladder containing propellant located in each of said propellant tanks;
   a piston assembly comprising a forward and aft piston head connected to said rolling bladders and mechanically joined by a connecting rod; and
   gas generator means located in said connecting rod for driving said piston assembly to traverse said said propellant tanks causing said bladders to roll back on themselves whereby the propellants are expelled from said tanks.

2. A power plant feed system as recited in claim 1, wherein said propellant tanks are tandemly arranged within said housing and said rolling bladders are formed of metal and are bonded to the inside of said propellant tanks.

3. A power plant feed system as recited in claim 1, wherein each of said piston heads is fixedly attached to a forward portion of each of said rolling bladders.

4. A power plant feed system as recited in claim 3, wherein a metal bulkhead separates said tandemly arranged propellant tanks and retains a dynamic seal through which said connecting rod moves.

5. A power plant feed system as recited in claim 1, wherein a passage is formed in said connecting rod whereby said gas generator may supply high pressure gas to drive said aft piston.

6. A power plant feed system comprising:
   a housing;
   a forward and aft propellant tank tandemly arranged in said housing;
   a metal rolling bladder containing propellant located in each of said propellant tanks and bonded thereto;

a piston assembly comprising a forward and aft piston head connected to said rolling bladders and mechanically joined by a connecting rod;

a metal shear seal welded to both said connecting rod and the bladder located in said forward propellant tank to hermetically seal the propellant in said forward bladder; and means for driving said piston assembly to traverse said propellant tanks causing said bladders to roll back on themselves whereby the propellants are expelled from said tanks.

7. A power plant feed system comprising:

a housing;

a forward and aft propellant tank tandemly arranged in said housing;

a metal rolling bladder containing propellant located in each of said propellant tanks and bonded thereto;

a piston assembly comprising a forward and aft piston head connected to said rolling bladders and mechanically joined by a connecting rod;

a metal burst band being located on the aft side of said dynamic seal to hermetically seal the propellant; and means for driving said piston assembly to traverse said propellant tanks causing said bladders to roll back on themselves whereby the propellants are expelled from said tanks.

* * * * *